United States Patent Office 2,721,171
Patented Oct. 18, 1955

2,721,171

IONIC ELECTROCHEMICAL REACTIONS

Harold Wilfred Arnold, Claymont, and Gilbert P. Monet, Wilmington, Del., assignors to E. I. du Pont de Nemours & Company, Wilmington, Del., a corporation of Delaware No Drawing. Application November 1, 1951, Serial No. 254,461

3 Claims. (Cl. 204—180)

This invention relates to ionic electrochemical reactions and, more particularly, to a process of carrying out such reactions in a multi-compartmented cell.

Ionic reactions which are conducted with electric current, are of considerable technical importance in the preparation and purification of various materials. When electrical energy is passed through a solution containing ions, the current is carried by negative ions or anions moving toward the anode and by positive ions or cations moving toward the cathode. The use of selective anion and cation barrier membranes which permit the passage of the current and either anions or cations but bar the movement of the other ions, will permit preparation, concentration and/or purification of ionizable compounds.

In simplest form an ionic electrochemical reaction using alternate selective ion barriers, would be carried out in a three-compartment cell with the electrodes placed in the end compartments and the center compartment separated on each side from the end compartments by a selective ion barrier. In applicants' application Serial No. 252,428, entitled "Process of Carrying out Ionic Electrochemical Reactions" filed October 20, 1951, there is disclosed a process of carrying out ionic electrochemical reactions in a cell having four or more compartments separated alternately by selective anion and cation barrier membranes. This process comprises conducting an electric current through at least one series of four aqueous solutions of ionizable compounds separated alternately by selective anion and cation barrier membranes, the two terminal aqueous solutions containing at least one ion in common with the aqueous solution adjacent thereto and each of the intermediate aqueous solutions containing at least one cation in common with the adjacent aqueous solution on one side and at least one anion in common with the adjacent solution on the opposite side.

An advantage of the above process is that it permits satisfactory recovery of a compound containing an ion which is susceptible to decomposition at the electrode, a recovery that clearly would not be possible if the compound were formed in a compartment in which one of the electrodes was placed, as would necessarily be the case in a three-compartment cell.

A preferred form of the process disclosed in the aforementioned application comprises conducting the electric current through a plurality of aqueous solutions separated alternately by selective anion and cation barrier membranes, the plurality of aqueous solutions being a repeated series of four aqueous solutions, each series consisting of in order: an aqueous solution of an ionizable reactant compound; an aqueous solution containing sufficient electrolyte to conduct the current; a second aqueous solution of an ionizable compound; and a second aqueous solution containing sufficient electrolyte to conduct the current; the alternate anion and cation barriers being so ordered with respect to the direction of the current that ions only pass out of said first and third aqueous solution and only pass into said second and fourth aqueous solution in each series of solutions.

An outstanding advantage of this preferred form of the process using a multi-compartmented cell is the saving in power consumption due to the repeated series of four aqueous solutions, as contrasted to a reaction carried out in a three- or four-compartment cell. Theoretically, the amount of electric current required for passage through an electrolytic system is proportional to the reaction taking place at the electrodes. In a multi-compartmented system in which the resistance is not high, it has been found possible to effect various electrolytic reactions in the intermediate compartments with suitable barrier membranes of low resistance and high selectivity with an amount of current proportional to that required for the electrode reactions in the two terminal compartments. Thus, since the passage of one faraday between the electrodes moves one equivalent of electrolyte throughout the cell, a cell containing many compartments suitably separated by alternate anion and cation selective barrier membranes should produce many equivalents of a desired product by the passage of a unit of current and it has been found that this is the case. By suitable removal and addition of aqueous solutions and maintaining a substantially constant environment in each compartment, the process can be carried out over prolonged periods with low power consumption and high efficiency.

It will be noted that in the process discussed above, each compartment of the cell must contain sufficient electrolyte to conduct the current. For example, if plain water were placed in one compartment, the electrical resistance of the system would be excessive and the process would be of little, if any, value.

In any ionic electrochemical reaction system using alternate anion and cation barriers, the intermediate compartments of a cell will alternate in that, when the electric current is flowing, both anions and cations will pass out of one compartment while both anions and cations will pass into the adjacent compartment. Obviously, those compartments out of which the anions and cations pass, must contain an electrolyte to conduct the current or otherwise the resistance of the system will be too great for it to be of practical value; for example, it would not be practical to use plain water in these compartments. On the other hand, there are frequent instances where it is desired to furnish only hydrogen ions to the compartment on one side of a given compartment and only hydroxyl ions to the compartment on the other side of the given compartment. Clearly, using an ordinary electrolyte, this cannot be done because even if an ionizable acid or base were placed in a given compartment, an anion other than hydroxyl or a cation other than hydrogen, respectively, would pass into the adjacent compartment. Short of using plain water in the compartment with the resultant impractically high resistance of the system, there has been no way of furnishing both hydrogen and hydroxyl ions, and no other ions, from any single compartment in a cell.

An object of the present invention is to provide a new and improved process of carrying out ionic electrochemical reactions. A more particular object is to provide such a process carried out in a multi-compartmented cell wherein one or more intermediate compartments furnish hydrogen and hydroxyl ions but no other ions to adjacent compartments without abnormally increasing the electric resistance of the system. Other objects will be apparent from the description of the invention given hereinafter.

The above objects are accomplished according to the present invention by conducting an electric current through a series of aqueous solutions of ionizable compounds separated alternately by selective anion and cation barrier membranes, at least one intermediate solution in said series being an aqueous solution of a high molecular weight compound from the group consisting of strong acids and bases, one of whose ions is too large to pass through said barrier membranes, said intermediate solution being separated by a selective cation barrier membrane from the adjacent aqueous solution on the anode side and by a selective anion barrier membrane from the adjacent solution on the cathode side of said series.

The present invention resides in large measure in the use of a high molecular weight acid or base in those compartments of an electrolytic reaction cell where it is desired to supply only hydrogen and hydroxyl ions to the adjacent compartments. It has been found that by the use of aqueous solutions of a high molecular weight acid or base in those compartments, the current will be carried through the cell with no unusual increase in resistance but, contrary to the action when an ordinary low molecular weight acid or base is used, only hydrogen and hydroxyl ions pass through the barriers separating the compartment from the adjacent compartments. The explanation for this seems to be that, for example, a high molecular weight acid such as polybenzyl sulfonic acid, ionizes to give hydrogen ions and large polybenzyl sulfonate ions, the former readily diffusible through the selective anion barrier, but the latter, due to their relatively great size, being unable to pass through the selective cation barrier, i. e., they are non-diffusible. Whatever the correct explanation is, the actual fact is that hydroxyl ions, instead of polybenzyl sulfonate ions, pass through the cation barrier. A generalized set up of an electrodialysis cell according to this invention may be shown as follows:

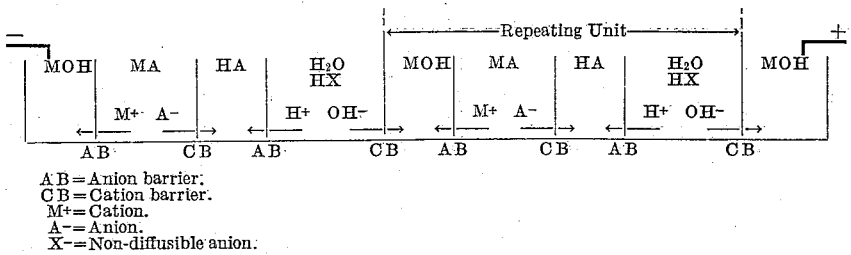

AB = Anion barrier.
CB = Cation barrier.
M+ = Cation.
A- = Anion.
X- = Non-diffusible anion.

If the compartments marked as having water contained only water, their resistances would be excessive. Upon addition of a high molecular weight strong acid having a non-diffusible anion, the solutions in these compartments become conductive. There is then a high concentration of hydrogen ions and a low concentration of hydroxyl ions. Electrical energy must be supplied to overcome the adverse osmotic pressure difference at the cation barriers separating the HX compartments from the MOH compartments. This has been calculated to be considerably less than the energy required for the decomposition of water by electrode reactions. Assuming that a large number of repeating units would be used, the percentage of the total energy consumed by the electrode reactions would be relatively small and, comparing the conventional electrolytic decomposition of salts with the electrodialytic process of this invention, the total energy requirement for the production of the same number of equivalents of metal hydroxide and acid would be lowered by the difference btween the E. M. F. of decomposition of water at the electrodes and the E. M. F. required to overcome osmotic pressure differences plus the E. M. F. required to overcome such resistances which are due to the membranes and solutions employed. A substantial saving in power is attainable through the use of the instant process.

In the above, it will be apparent that a high molecular weight strong base instead of the high molecular weight strong acid could be used. Further, that in large scale operation, there would normally be a considerable number of the repeating units of four solutions.

Various anion and cation selective barrier membranes are readily available and the specific membrane used does not form a part of the present process invention. Nevertheless, successful operation of the process does depend on using suitable membranes, i. e., those of low resistance and high ion selectivity. Preferred barrier membranes comprise vulcanized compositions containing at least 50%, by weight of the composition, of an ion exchange resin having a particle size in the range of 0.2 to 30 microns dispersed in a synthetic rubber polymer such as polymeric butadiene, chloroprene, or the like. Such preferred barrier membranes are described in detail and claimed in application Serial No. 237,489, filed in the name of H. W. Arnold, July 18, 1951, now abandoned.

The following examples wherein all proportions are given by weight unless otherwise stated illustrate specific embodiments of the present invention. The electrolytic reactions were carried out in multi-compartmented cells using selective ion barrier membranes as separators between the various compartments. The cells were constructed of polymethyl methacrylate and each compartment was fitted with inlet and outlet tubes to permit the easy addition and removal of solution. The width of the compartments was approximately one inch and the entire assembly was held in place by means of clamps. Since the membranes used were resilient enough to give a tight seal, no gaskets were used. The electrodes used were bright platinum of approximately one square centimeter area and the source of electric current was either from a generator or a bank of dry cells, the particular source being immaterial in so far as illustrating the invention is concerned.

*Example I*

This illustrates the electrodialytic production of sulfuric acid from sodium sulfate, employing polybenzyl sulfonic acid as the non-diffusible electrolyte. It also shows the arrangement of a unit series of solutions that would be employed in a commercial operation using a number of these unit series for the production of both sulfuric acid and sodium hydroxide.

The five-compartment cell setup shown below was used:

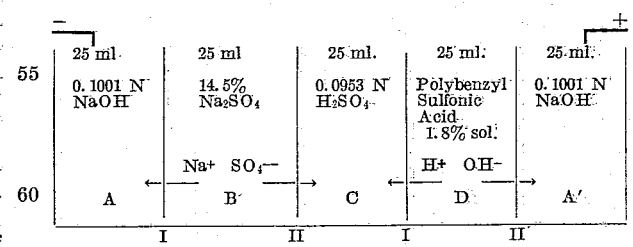

Barrier I was a selective anion barrier membrane of vulcanized butyl rubber (GR-I) containing 52%, by weight of the composition, of the resin Nalcite HCR, a strong acid cation exchange resin similar to that described in J. Am. Chem. Soc. 69, 2830 (1947). It had a resistance of 0.061 ohm/sq. ft. and a characteristic concentration potential (c. c. p.) equal to +55 millivolts. Barrier II was a selective cation barrier membrane of vulcanized polychloroprene containing 62.2%, by weight of the composition, of the resin Dowex-1, a strong base anion exchange resin similar to that described in Ind. Eng. Chem. 43, 1088 (1951). It had a resistance of 0.0530 ohm/sq. ft. and a c. c. p. equal to −50 millivolts.

Data on the electrolysis are given in the following table:

| Time (Minutes) | Volts | Amps. | Resistance, Ohms |
| --- | --- | --- | --- |
| Initial | 14 | 0.04 | 350 |
| 20 | 14 | 0.04 | 350 |
| 65 | 14 | 0.05 | 280 |
| 90 | 14 | 0.045 | 315 |
| 120 | 14 | 0.05 | 280 |
| 1,075 | 14 | 0.045 | 315 |

The weight of sulfuric acid transferred into compartment C was 1.50 g., compared with the calculated value of 1.48 g. based on an estimation of the total current passed (0.0302 faradays). Lower resistance is achieved by increasing the polybenzyl sulfonic acid concentration.

In this example sulfuric acid was obtained in compartment C due to the transfer of hydrogen ions from compartment D and sulfate ions from compartment B; the same result would have been obtained if, for instance, the electrolyte in compartment D had been hydrochloric acid instead of polybenzyl sulfonic acid. However, because polybenzyl sulfonic acid was used and the polybenzyl sulfonate ions were too large to pass through barrier II, hydroxyl ions were transferred to compartment A' rather than chlorine ions as would have been the case if hydrochloric acid were the electrolyte. This is a highly important difference in commercial applications where a number of the unit series of solutions A, B, C and D would be repeated. It will be apparent that if compartment A' is regarded as the beginning of a second unit series of solutions A, B, C and D, then sodium ions will pass into compartment A' from the next adjacent compartment on the right which would be a second compartment B and contain the sodium sulfate solution. Therefore, compartment A' would gradually build up a concentration of sodium hydroxide from the hydroxyl and sodium ions being introduced. By contrast, an ordinary electrolyte in compartment D would necessarily furnish, not hydroxyl ions to compartment A' but some other anion which would result in the formation of some sodium salt rather than sodium hydroxide. Thus, the use of the high molecular weight acid in compartment D allows the production of sodium hydroxide in this type of reaction whereas it would not be feasible if an ordinary electrolyte were used in compartment D or if no electrolyte at all were used in that compartment.

*Example II*

This illustrates the electrodialytic production of both sulfuric acid and sodium hydroxide from sodium sulfate in a system employing a number of unit series of solutions.

A twenty-one-compartment cell was used in which the compartments were separated alternately by selective anion and cation barrier membranes beginning with an anion barrier membrane separating the first and second compartments. The cathode was placed in compartment 1 and the anode in compartment 21. Both anion and cation barrier membranes were substantially the same as those used in Example I.

All of the compartments contained a 15% aqueous solution of sodium sulfate except compartments 4, 8, 12, 16 and 20 which contained an 8% aqueous solution of polybenzyl sulfuric acid. This arrangement in substance simply comprises five repeating units of the series of solutions in compartments A, B, C and D of Example I except that instead of the sodium hydroxide and sulfuric acid solutions used in cells A and C, solutions of sodium sulfate were used at the start in this example. However, sodium hydroxide and sulfuric acid solutions could have been used instead.

The resistance of the system was 210 ohms at 0.23 ampere with 46.8 volts at the start and, at the end of 40 minutes, the resistance had decreased to 134 ohms. Electrolysis was readily observed by change in pH concentration in the compartments, cells 3, 7, 11, 15 and 19 becoming acidic through the formation of sulfuric acid while cells 5, 9, 13, 17 and 21 became basic through the formation of sodium hydroxide. The polybenzyl sulfonate ions in cells 4, 8, 12, 16 and 20 were non-diffusible.

It will be understood that the foregoing examples are merely illustrative and that the invention broadly comprises carrying out ionic electrochemical reactions by conducting an electric current through a series of aqueous solutions of ionizable compounds separated alternately by selective anion and cation barrier membranes, at least one intermediate solution in such series being an aqueous solution of a high molecular weight compound from the group consisting of strong acids and bases, one of whose ions is too large to pass through the barrier membrane, the intermediate solution being separated by a selective cation barrier membrane from the adjacent aqueous solution on the anode side and by a selective anion barrier membrane from the adjacent solution on the cathode side of the series of solutions.

The important factor in this invention is the presence of a large molecule, non-diffusible electrolyte in one or more compartments of the electrolytic cell in conjunction with an anion barrier on the cathode side and a cation barrier on the anode side of the composition or compositions in question. If the composition containing the large molecule electrolyte contained water instead, the amount of electrical energy required to overcome the resistance of the water would be too high to make such an electrolytic process practical and no other means of furnishing both hydrogen and hydroxyl ions, and no other ions, from a given compartment is known.

It is an essential requirement of the large molecule electrolyte for use in the present invention that it will ionize in water to give either hydrogen or hydroxyl ions and a second ion which latter is so large that it cannot diffuse through the permeable, selective ion barrier membranes separating the compartments. Such electrolytes include water-soluble, strong acids or bases having a molecular weight of at least 200. Electrolytes of lower molecular weight are useable providing they are non-diffusing but, since there are numerous suitable acids and bases of molecular weight of at least 200 available and such compounds insure a large ion that will not diffuse through the barrier membranes, such acids and bases are preferred so that any danger of the large ions diffusing through the barrier membranes appreciably can be avoided.

The non-diffusible, acid electrolytes suitable for use in this invention include a wide assortment of water-soluble acids, particularly polymeric organic compounds containing at least one strongly acidic group. Sulfonated polystyrene and various aromatic sulfonic acids having a molecular weight of at least 200 are especially adapted for this purpose. Strong organic bases of high molecular weight are likewise well suited for use in this invention. These include such water-soluble compounds as quaternized polyvinyl pyridine and long-chain quaternized aliphatic amines having a molecular weight of at least 200.

Specific acids and bases which can be used effectively in this invention include 4,4'-diamino-2,2'-biphenyl disulfonic acid, cetyl pyridinium hydroxide, naphthalene beta-sulfonic acid, nonyl naphthalene sulfonic acid, lignin sulfonic acid, 1-amino-8-naphthol-3,6-disulfonic acid, cetyl dimethyl benzyl ammonium hydroxide, lauryl pyridinium hydroxide and polyphosphoric acids. Organic compounds are generally used.

It is preferred to use as the selective ion barriers, membranes made from an ion exchange resin mixed with a synthetic rubber followed by curing, as previously stated. After thorough mixing of the ion exchange resin and synthetic rubber followed by addition of curing agents, the composition is formed into sheets or membranes and cured, the temperature of mixing and curing being maintained low enough to avoid any substantial decomposition of the ion exchange resin.

Although homogeneous synthetic resin ion barriers such as water-insoluble sulfonated styrene copolymers or methacrylic acid polymers and copolymers can be employed, such ion barriers are not preferred because they do not possess the mechanical strength of the membranes made from synthetic rubber compositions.

The use of a large molecule electrolyte according to the present invention has two major advantages: It provides a way of furnishing hydrogen and hydroxyl ions, and no other ions, from an intermediate compartment in an electrolytic cell without unduly increasing the resistance of the cell. But further, it also provides a way of making a non-conductive aqueous solution conductive without necessitating replenishing electrolyte.

As an illustration of the above, this process can be used to advantage in the purification of brackish or sea water. Such water is not sufficiently conductive to attempt its purification electrolytically without adding electrolyte to the water. If an ordinary, diffusible electrolyte is added, the resistance of the cell is reduced and the brackish water can be purified. However, there are disadvantages in this procedure because the electrolyte diffuses from alternate compartments and may require replenishing to keep the brackish water conductive and, also, ions other than hydrogen and hydroxyl ions will be passing into alternate compartments which may be objectionable. However, if a large molecule electrolyte is added to the brackish water, it does not diffuse and, hence, need not be replenished; further, it does not introduce ions other than hydrogen and hydroxyl ions into the alternate compartments. Precipitation of the large molecule electrolyte as an insoluble salt and its removal gives water of improved purity and the electrolyte can be recovered from the insoluble salt.

The instant process is applicable to any ionic electrochemical reaction involving a series of solutions wherein there is at least one intermediate solution separated by a selective cation barrier membrane from the adjacent aqueous solution on the anode side and by a selective anion barrier membrane from the adjacent aqueous solution on the cathode side of the series of solutions. However, the invention is of greatest advantage where a considerable number of solutions separated by alternate anion and cation barriers are used because of the important savings in power consumption effected by such an arrangement. Usually, this will involve repeating units of two or four solutions.

The present process does not exclude the addition of a high molecular weight electrolyte to any or all the solutions in a series. For example, in the purification of brackish water a high molecular weight electrolyte can be added to all the solutions to improve their conductivity and normally this would be done. Also, the use of a salt of a high molecular weight acid or base is an obvious equivalent to the use of the acid or base itself if, for a limited period, the introduction of an ion other than hydrogen or hydroxyl ions into the compartment adjacent the one containing the high molecular weight electrolyte, is not detrimental. Eventually, the diffusible ion will be used up and the process will then continue as if the high molecular weight acid or base had been used as the electrolyte at the start.

Conventional equipment such as a filter press-type dialyzer is quite suitable for carrying out the instant process providing the barrier membranes are suitably mounted between the compartments to prevent leakage around the membranes. Time and temperature are not critical in this process and are largely dependent upon the particular operation being carried out. In general, the resistance of the membranes to ion diffusion is decreased by elevating the temperatures and at the same time the screening efficiency of the membranes is improved.

The process of this invention can be applied to electrolysis and electrodialysis reactions. It can be used for the purification of brackish or sea water and in the hydrolysis of all manner of salts such as sodium nitrate, sodium chloride, sodium phosphate and the like.

The outstanding advantage of the invention is that it provides a thoroughly practical means of furnishing hydrogen and hydroxyl ions only from an intermediate solution in a series of solutions in carrying out electrochemical reactions as hereinbefore described. A further advantage of the invention is that it provides a method of making a non-conductive aqueous solution conductive without the necessity of replenishing the electrolyte. Because of these two advantages the present invention provides a means of carrying out a large number of reactions which could not be carried out in any feasible manner employing any of the processes heretofore known.

As many apparently widely different embodiments of this invention may be made without departing from the spirit and scope thereof, it is to be understood that the invention is not limited to the specific embodiments thereof except as defined in the appended claims.

The invention claimed is:

1. Process of carrying out ionic electro-chemical reactions which comprises conducting an electric current through a series of aqueous solutions of ionizable compounds separated alternately by selective anion and cation barrier membranes, at least one intermediate solution in said series being an aqueous solution of a compound from the group consisting of strong acids and bases having a molecular weight of at least 200, all of whose ions of one sign are too large to pass through said barrier membranes and all of whose ions of the opposite sign are small enough to pass through said barrier membranes, said intermediate solution being separated by a selective cation barrier membrane from the adjacent aqueous solution on the anode side and by a selective anion barrier membrane from the adjacent solution on the cathode side of said series.

2. Process as set forth in claim 1 wherein said high molecular weight compound is polybenzyl sulfonic acid.

3. Process as set forth in claim 1 wherein said high molecular weight compound is a polymer containing a plurality of sulfonic acid groups.

References Cited in the file of this patent
UNITED STATES PATENTS 2,502,614     Zender _____ Apr. 4, 1950

OTHER REFERENCES

Sollner: Journal Electrochemical Society, vol. 97, No. 7, July 1950, pp. 139c–151c.

Meyer et al.: Helvetica Chimica Acta, vol. 23 (1940), pp. 795–800.